United States Patent [19]
Muddiman

[11] Patent Number: 5,381,821
[45] Date of Patent: Jan. 17, 1995

[54] FLUID CHECK VALVE WITH REPLACEABLE FLAPPER ASSEMBLY

[76] Inventor: Robert W. Muddiman, 487 Speers Road, Oakville, Ontario, Canada, L6K 2G4

[21] Appl. No.: 121,432

[22] Filed: Sep. 16, 1993

Related U.S. Application Data

[63] Continuation-in-part of Ser. No. 891,199, Jun. 1, 1992, Pat. No. 5,246,032, and Ser. No. 19,832, Feb. 19, 1993, Pat. No. 5,318,063.

[30] Foreign Application Priority Data

Feb. 10, 1992 [CA] Canada .................................. 2060816

[51] Int. Cl.6 ............................................. F16K 15/03
[52] U.S. Cl. .............................. 137/454.2; 137/512.1; 137/527.4
[58] Field of Search ................ 137/454.2, 512.1, 527.4

[56] References Cited

U.S. PATENT DOCUMENTS

| | | | |
|---|---|---|---|
| 3,072,141 | 1/1963 | Wheeler | 137/512.1 |
| 4,079,751 | 3/1978 | Partridge | 137/512.1 X |
| 4,257,444 | 3/1981 | Ogle | 137/512.1 X |
| 4,694,853 | 9/1987 | Goodwin | 137/512.1 |
| 4,977,926 | 12/1990 | Hocking | 137/512.1 |
| 5,150,733 | 9/1992 | Scaramucci | 137/454.2 |
| 5,246,032 | 9/1993 | Muddiman | 137/512.1 |

*Primary Examiner*—Robert G. Nilson
*Attorney, Agent, or Firm*—McFadden, Fincham

[57] ABSTRACT

A replaceable flapper and keeper assembly for a fluid check valve. The assembly may be part of a larger replaceable seat ring assembly or be adapted to be secured directly on an integral check valve seat. The flappers have hinge brackets and are pivotally attached to a hinge pin that extends through holes in keepers. The flappers are adapted to be moveable in the direction of the valve axis (or normal to the plane of the flappers when in closed position) by having the holes in their hinge brackets elongated only in this direction. The flappers are able to move downstream of the seat before opening, minimizing wear and damage. Flapper, keeper and hinge pin are easily replaceable.

6 Claims, 4 Drawing Sheets

FLUID CHECK VALVE WITH REPLACEABLE FLAPPER ASSEMBLY

This application is a continuation-in-part of U.S. application Ser. No. 07/891,199 filed Jun. 1, 1992 in the name of Robert W. Muddiman, now U.S. Pat. No. 5,246,032, and of U.S. application Ser. No. 08/019,832 filed Feb. 19, 1993, U.S. Pat. No. 5,318,063 also in the name of Robert W. Muddiman.

This invention relates to fluid check valves and is particularly concerned with providing a fluid check valve which has two valve flappers and a valve seat which may be replaceable. The replaceable valve seat is part of a seat member or ring which also carries two spaced opposed keepers for pivotally mounting the flappers. Where the valve seat is fixed, the flappers are held in place by two holding members anchored between the seat and projections from the bore wall.

BACKGROUND AND PRIOR ART

The present invention provides for two advantages. In previous types of double-flapper check valves, hinge and stop pins are installed through holes which extend through the wall of the valve body. After installation of the pins, the holes are sealed by plugs or other means. While initially effective, there is a possibility of leakage from the inside to the outside past the seals.

Another disadvantage of the previous designs is that the flappers are free to move sideways in the bore. This sideways movement causes extra wear on the wall of the flapper hinge or bushing, depending upon actual design.

One modification made to avoid holes through the wall is to mount pins in inserts which fit into cavities machined into the inner surface of the body wall. These inserts are retained in place by various means. U.S. Pat. No. 4,694,853 describes and illustrates the various embodiments in which hinge pins and stop pins are mounted in insert position in recesses in the body wall.

Although holes through the body wall are eliminated, and thus also potential leak paths, the modifications using inserts are expensive to manufacture and the design can restrict the particular type of gasket that can be used. Thinning of the wall occurs, which is not desirable. Also, the holes through the inserts for the hinge pins are round and permit sideways movement of the hinge pins which causes wear and increased maintenance of hinge parts and of the seal faces.

In the parent applications mentioned above, the flapper hinge pins have no clearance in the hinge holes in the flappers but have clearance only in the axial direction in the keepers or holding members. It has now been found that equivalent results can be obtained by having the clearance or elongated holes in the hinge on the flappers themselves.

The present invention provides for the flappers to be moveable at their hinge in the direction of the valve axis. The keepers or holding members for mounting the flappers, maintain the hinge pin on a fixed axis so that the pin does not travel axially.

By the present invention, replaceable flappers (or flappers plus seat ring) are provided in which the hinge holes in the flappers are elongated in the direction of the valve axis to allow movement of the flappers off the seat or toward the seat but not sideways. This movement has been found to minimize wear both on the hinge parts and on the seal faces.

SUMMARY

The invention includes a replaceable flapper and keeper assembly for a fluid check valve comprising: a pair of substantially semi-circular flappers having hinge brackets thereon; a pair of keepers positioned at opposite ends of the hinge brackets and having aligned holes therein; and a hinge pin passing through the keepers and the flapper hinge brackets securing the flappers in hinged relationship; the holes in the flapper hinge brackets being elongated in a direction normal to the plane of the flappers when in closed position.

The invention also covers a replaceable valve seat and flapper assembly for a fluid check valve, comprising: a substantially tubular seat ring having an annular seat surface at one end and having mounting means to enable mounting in the valve bore when in position; a pair of keepers for positioning on the seat ring each keeper having attachment means to enable attachment to the seat ring adjacent to the seat surface, the keepers extending axially from the seat surface; a pair of substantially semi-circular flappers for positioning between the keepers to form a valve closure able to seal against the seat surface, and pivot or hinge means for pivotally mounting the flappers in the keepers including hinge brackets on the flappers having hinge pin holes elongated in a direction normal to the plane of the flappers when in closed position; the assembly, when assembled, being a sliding fit when inserted in the bore of a valve.

In one aspect, the invention provides a replaceable valve seat and flapper assembly for a fluid check valve, which has a tubular seat ring, having an annular seat surface at one end and a reduced diameter portion at the other end, a pair of diametrically opposed flat surfaces on an external surface of the seat ring adjacent the seat surface, a pair of keepers for positioning on the seat ring, a pair of substantially semi-circular flappers for positioning between the keepers and having hinge brackets modified as described; and a pivot pin for pivotally mounting the flappers in the keepers, and a retaining ring for engaging with the reduced diameter portion, the seat ring, keepers and flappers, when assembled, being a sliding fit in the bore of a valve, the retaining ring acting to hold the seat ring against an abutment in the valve bore.

BRIEF DESCRIPTION OF THE DRAWINGS

The invention will be readily understood by the following description of certain embodiments, by way of example, in conjunction with the accompanying drawings, in which:

As illustrated in FIGS. 1 and 2, a check valve comprises a tubular body 10 with a forward end 12 and a rearward end 14. The flow is normally in the direction of the arrow A.

DETAILED DESCRIPTION AND PREFERRED EMBODIMENTS

Figure 1:
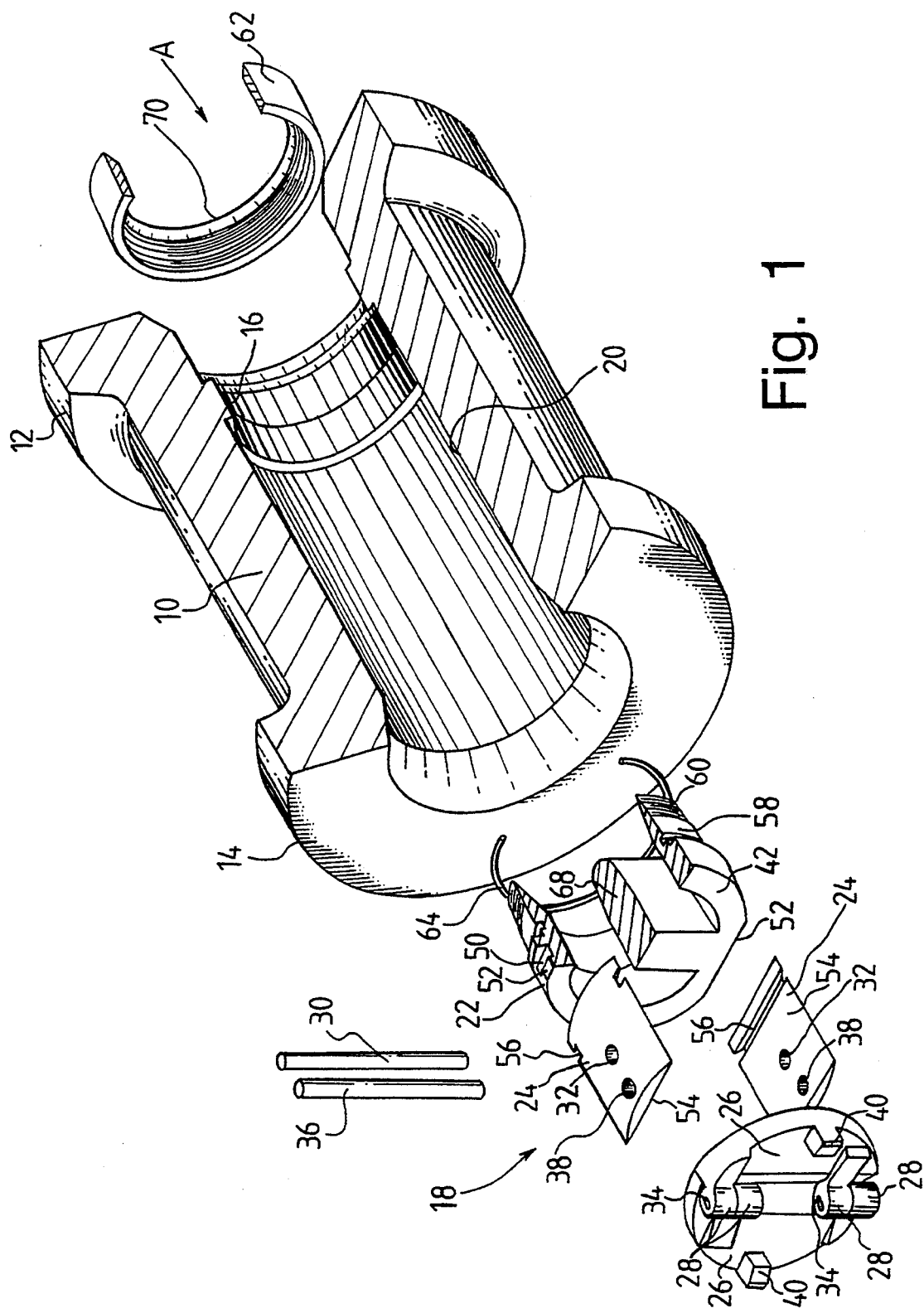
FIG. 1 is a sectioned, exploded perspective view of one form of valve in accordance with the invention.
Figure 2:
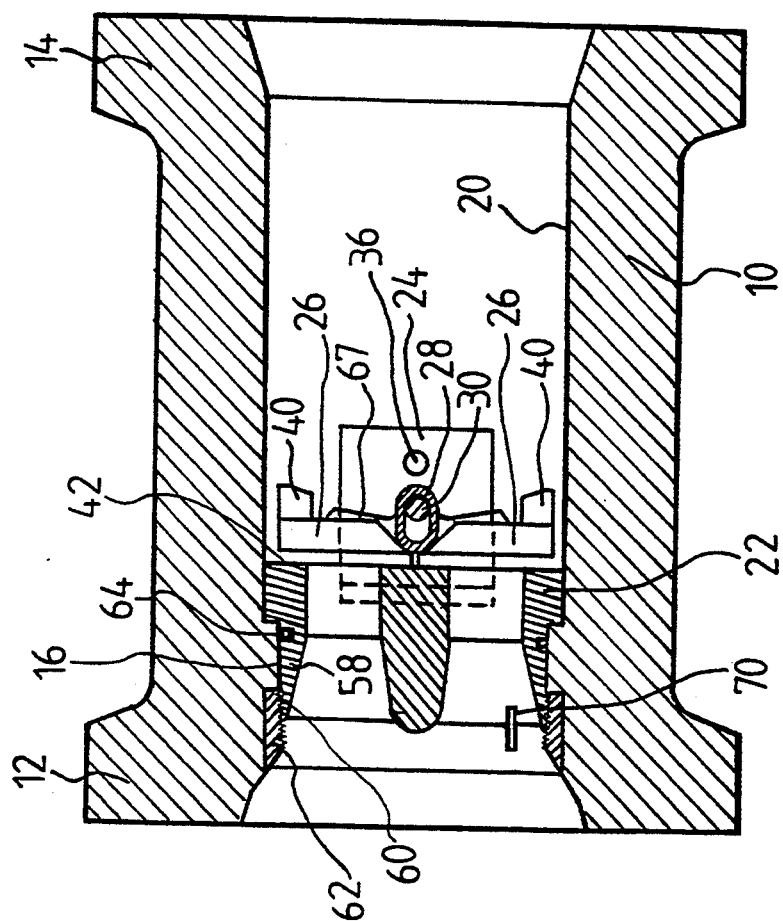
FIG. 2 is a longitudinal cross-section of an assembled valve, of the form of FIG. 1.

In the example as illustrated in FIGS. 1 and 2, adjacent the forward end 12 is an annular rib 16. A flapper and seat assembly, indicated generally at 18 in FIG. 1, is a sliding fit in the bore 20 of the body 10. The assembly 18 comprises a seat ring 22, two keepers 24, two flappers 26, having aligned hinged portions 28, and a hinge pin 30. The hinge pin passes through bores 32 in the keepers 24 and through elongated cross-section bores 34 in the hinge portions 28. The bores 34 are elongate in the direction of the longitudinal axis of the valve, and have a transverse dimension such that the hinge pin can slide in the elongate slots, but not move sideways. This elongation has a length such that it enables the flappers to move downstream, but the flappers are prevented from moving sideways (usually this length is about ⅛ inch or about 3 mm). This downstream but not sideways movement reduces wear and damage (and hence maintenance) of the hinge and seat surfaces. The bores 32 in the keepers 24 are round with no extra clearance. This allows the flappers (but not the pin) to move downstream off the seat before opening.

A stop pin 36 can also be provided, extending through bores 38 in the keepers 24, to limit opening of each flapper. Alternatively, or in addition, stop members 40 can be provided on the flappers 26. The seat ring 22 has a valve seating 42.

As can be particularly seen in FIG. 1, the seat ring 22 has two flat surfaces 50 diametrically opposed on the main body of the seat ring. A rib 52 extends on each surface 50, the ribs extending transversely to the axis of the valve. Each keeper has a somewhat segmental form, the flat surface 54 of each keeper cooperating with a surface 50. A groove 56 on each surface 54 receives the rib 52.

Extending axially from the main body of the seat ring, is an annular skirt 58. The skirt 58 extends within the annular rib 16 in the bore on the body 10, and has an externally threaded end portion 60. An internally threaded retainer ring 62 screws onto the threaded portion 60. An O-ring 64 fits in a groove 66. A light spring 67 acts on the flappers, urging them to a closed position, the flappers urged to an open position by the normal flow through the valve. If a reverse flow occurs, the flappers shut against the seating 42.

A transverse member 68 is normally provided extending from the seat level and is aligned with the flat surface 50, and with the hinge pin 30. After the retaining ring has been tightened onto the skirt 58 of the seat ring, a hole can be drilled and a pin 70 inserted, in the interengaging threads to lock the retaining ring in position.

To assemble the valve, the O-ring 64 is positioned in the groove 66 and the keepers 24 are slid into position on the surfaces 50. The flappers are positioned on the seat ring between the keepers and the hinge pin inserted and also the stop pin if provided. The assembly is then slid into the bore 20 of the body until it rests on the rib 16. The retaining ring is screwed onto the seat ring, and the lock pin 70 then inserted. Holes can be formed in the outer end of the retaining ring for use by a tool for tightening the ring.

An alternative arrangement of seating ring and retaining ring is possible. The valve seat ring has a reduced diameter portion which extends axially a distance slightly less than the axial width of the rib 16. A separate retainer ring, a sliding fit in the valve body, rests against the rib 16 on the side opposite to that of the seat ring 22. A series of screws, for example socket head cap screws, extend through bores in the retainer ring into threaded holes in the seat ring. Tightening the screws clamps the seat ring to the rib. A seal can be provided.

Figure 3:
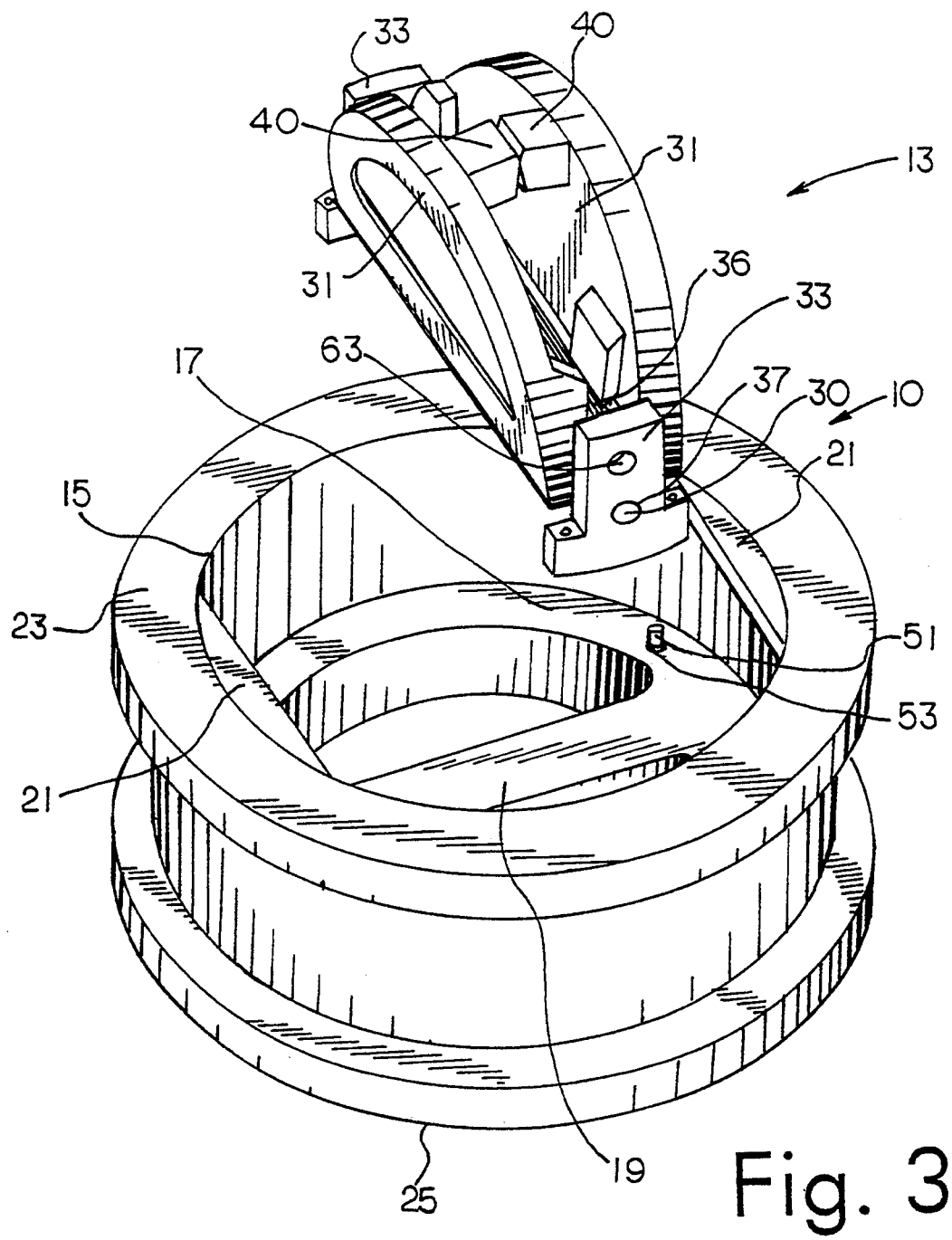
FIG. 3 is an exploded perspective view of another form of valve with the flapper and keeper assembly spaced from the body, the flappers being in open position.
Figure 4:
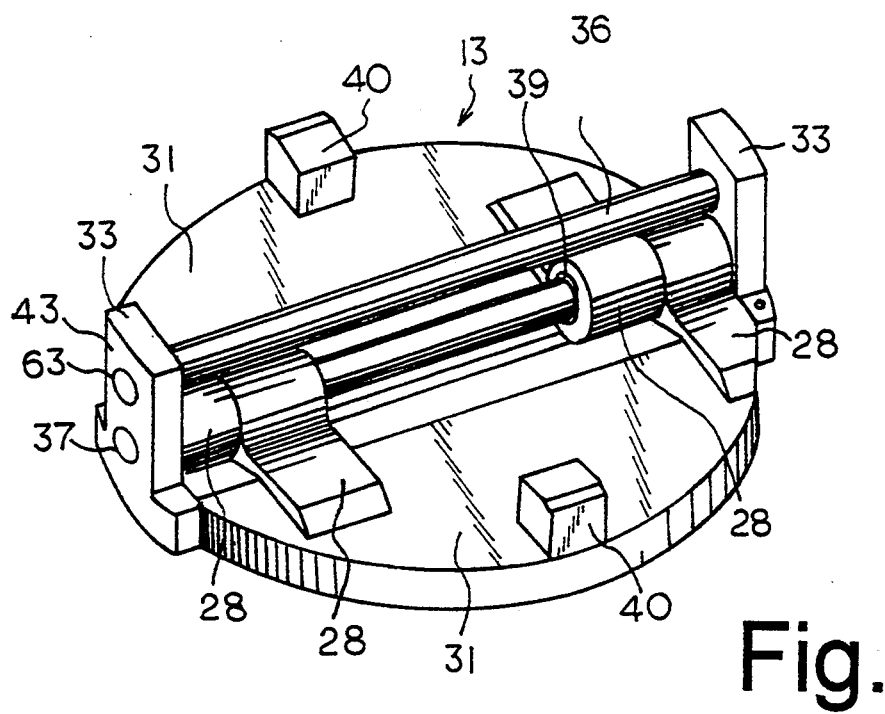
FIG. 4 is a perspective view of the flapper and keeper assembly of FIG. 3 shown in closed position.
Figure 5:
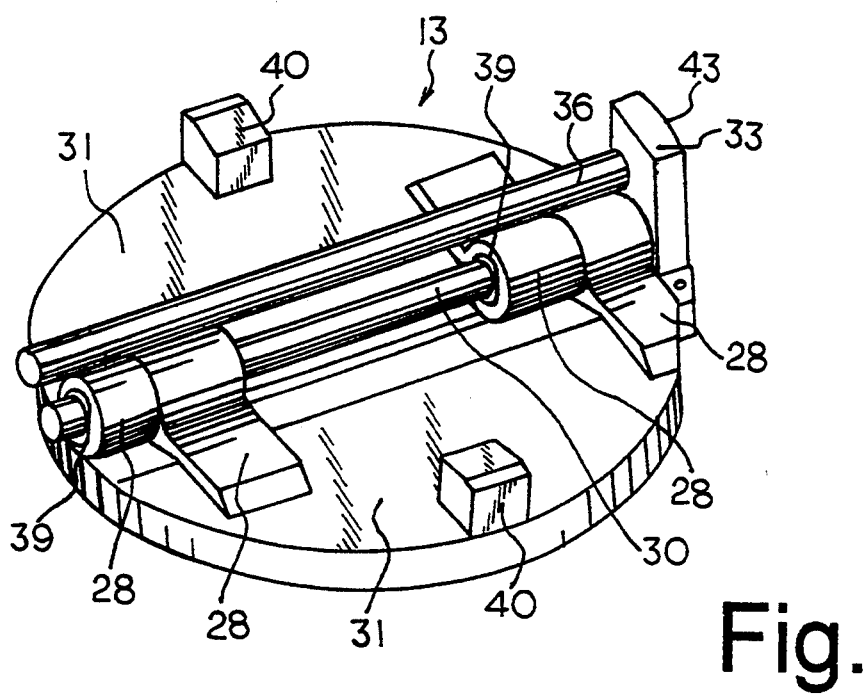
FIG. 5 is a view similar to FIG. 4 but with one keeper removed to show the elongated hole in the hinge brackets.

FIGS. 3 to 5 illustrate another embodiment of the invention with FIG. 3 illustrating, in exploded view, a check valve comprising a body 10 and a flapper assembly 13. The body 10 has a bore 15, in which is positioned a seat 17. A web 19 extends diametrically across the bore 15, in the example being at the level of the seat.

Extending in from the bore 15 are two retaining members, in the form of projections or webs 21, diametrically opposed. The projections 21 are aligned with the web 19. Gasket surfaces 23 and 25, respectively, are at each end of the valve body. When inserted in a pipe, fluid flow would normally be upwards in FIG. 3, as indicated by arrow A.

The flapper assembly 13 is seen more clearly in FIG. 4. The assembly comprises two substantially semi-circular flapper members 31, two keepers or holding members 33, and a hinge pin 30. In each keeper 33 is a hinge pin hole 37 in which the hinge pin 30 is mounted at each end. The flapper members 31 are mounted on the hinge pin 30 and can pivot from the position shown in FIG. 4 to the position shown in FIG. 3. The flapper members are mounted on the hinge pin by brackets 28 and stops 40 can be provided. The outer surfaces 43 of each of the keepers 33 is of the same profile as that of the surface of the bore so that they will be a close fit against the wall on the valve body. Normally the bore will be circular, and the outer surfaces of the keepers 33 will also be circular.

The flapper assembly 13 is positioned in the bore 15 by holding the flapper assembly in its open position, as in FIG. 3, and inserting the assembly into the bore, the flapper assembly 13 rotated so as to clear the projections 21. Once the keepers are resting on the seat 17, the assembly is rotated to bring the keepers 33 under the projections 21. The keepers 33 are in close fit between the seat 17 and the projections 21.

To prevent rotation of the flapper assembly relative to the valve body, once assembled, some form of retaining means is desirable. In the example illustrated in FIGS. 3-5, one or more locating pins 51 are positioned in the seating 17. The pins are positioned in bores 53 and are spring-loaded upward, as by compression springs. In the keepers 33, bores are formed to receive the pins 51 when the flapper assembly 13 is correctly positioned. Small diameter access holes are provided in the keepers for pushing down the pins 51 when it is desired to remove the flapper assembly 13. At the minimum, only one pin 51 is required and only one bore 53. For convenience, even with only one pin, a bore would be provided in each keeper so as to be independent of the orientation of the flapper assembly on insertion into the valve bore. Two or more pins can be provided, with suitable bores in the keepers or holding members.

If it is desirable, or necessary, to ensure that the flapper members 31 do not move such that one of the flapper members moves past the vertical, a stop pin can be provided. As seen in FIGS. 4 and 5, a stop pin 36 is mounted in bore 63 in the keeper 33.

An alternative provision for limiting the opening of the flapper members, is to form projections on the inner surfaces of the keepers which the flapper members contact on opening, limiting their travel.

Instead of spring-loaded pins 51 locating the flapper assembly, other means can be provided. For example, pins could be inserted through the keeper or holding member into bores in the seat. It would be necessary to ensure that the pins could not fall out during use.

In an alternative embodiment, which is a modification of the embodiment of FIGS. 3 to 5, a retaining member (like 21) in the form of a resilient or spring member, of annular form, in the shape of a circular spring, is seated in a groove machined or otherwise formed in the bore. An example of such a resilient member is one sold under the trade name Circlip. Generally, the member extends for a major part of the groove and has opposed ends having holes therein. By urging the ends together the member can be inserted into, and removed from, the groove. To assemble the flapper assembly into the valve body, the retaining member is removed, and the flapper assembly of keepers and flappers is inserted into the bore to rest on the seat. A retaining member is then inserted to retain the keepers against the seat. The pins maintain the keepers against rotation in the valve bore.

The elongate bores 34 and 39 permit movement only along the axis of the valve, to permit the back edges or "heels" of the flapper members to clear the seat as they rotate to the open position and also back to the closed position. In the event that these bores become worn to an extent that replacement is necessary only the flappers need be replaced. Alternatively it may only be necessary to replace the hinge pin 30 with an oversize pin.

I claim:

1. A replaceable flapper and keeper assembly for insertion into and removal from a fluid check valve comprising:
   a pair of substantially semi-circular flappers having hinge brackets thereon;
   a pair of keepers positioned at opposite ends of said hinge brackets and having aligned holes therein, and including means to enable mounting adjacent to a valve seat; and
   a hinge pin passing through the keepers and the flapper hinge brackets securing the flappers in hinged relationship;
   the holes in the flapper hinge brackets being elongated in a direction normal to the plane of the flappers when in closed position; the assembled flappers and keepers slidable into a bore of a valve.

2. A replaceable valve seat and flapper assembly for insertion into and removal from a fluid check valve, comprising:
   a substantially tubular seat ring having an annular seat surface at one end and having mounting means to enable mounting in the valve bore when in position;
   a pair of keepers for positioning on said seat ring, each keeper having attachment means to enable attachment to the seat ring adjacent to said seat surface, said keepers extending axially from said seat surface;
   a pair of substantially semi-circular flappers for positioning between said keepers to form a valve closure able to seal against said seat surface, and hinge means for pivotally mounting said flappers in said keepers, including hinge brackets on the flappers having hinge pin holes elongated in a direction normal to the plane of the flappers when in closed position;
   the assembly, when assembled, being a sliding fit when inserted in the bore of a valve.

3. The replaceable assembly of claim 2, wherein the mounting means comprises a retaining ring for positioning on the end of the seat ring remote from the seat surface, to enable retaining the seat ring against a raised portion of the valve bore.

4. The replaceable assembly of claim 2, wherein the mounting means comprises a rib on the seat ring extending radially therefrom, and sized to fit against an abutment in the valve bore.

5. The replaceable assembly of claim 2 including means to limit opening of each flapper to approximately 90°.

6. The replaceable assembly of claim 2 including means urging said flappers to a closed position.

* * * * *